(12) United States Patent
Harvey et al.

(10) Patent No.: US 9,505,070 B2
(45) Date of Patent: Nov. 29, 2016

(54) HAND SAW

(71) Applicant: Milwaukee Electric Tool Corporation, Brookfield, WI (US)

(72) Inventors: Kyle Harvey, Wauwatosa, WI (US); Steven W. Hyma, Milwaukee, WI (US); Timothy Janda, Kenosha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 145 days.

(21) Appl. No.: 14/334,214

(22) Filed: Jul. 17, 2014

(65) Prior Publication Data

US 2015/0020392 A1 Jan. 22, 2015

Related U.S. Application Data

(60) Provisional application No. 61/847,163, filed on Jul. 17, 2013.

(51) Int. Cl.
*B27B 21/02* (2006.01)
*B23D 51/12* (2006.01)

(52) U.S. Cl.
CPC ............. *B23D 51/125* (2013.01); *B27B 21/02* (2013.01)

(58) Field of Classification Search
CPC .... B23D 51/125; B23D 51/12; B23D 51/10; B27B 21/02
See application file for complete search history.

(56) References Cited

U.S. PATENT DOCUMENTS

| | | | |
|---|---|---|---|
| 280,928 A | 10/1883 | Hoffman | |
| 617,178 A | 3/1899 | Nusser | |
| 739,457 A | 9/1903 | Tilden | |
| 766,077 A | 7/1904 | Tilden | |
| 963,848 A | 7/1910 | Anderson | |
| 1,080,365 A | 2/1913 | O'Neill et al. | |
| 1,066,659 A | 7/1913 | Rodehaver | |
| 1,094,939 A | 4/1914 | Smith | |
| 1,113,591 A | 10/1914 | Wood | |
| 1,446,674 A | 2/1923 | Thompson | |
| 1,484,168 A | 2/1924 | Bertas et al. | |

(Continued)

FOREIGN PATENT DOCUMENTS

DE 20217051 1/2003

OTHER PUBLICATIONS

Greenlee, 12" Heavy Duty Hack Saw, MA-4907 (2006) 2 pages.

(Continued)

*Primary Examiner* — Stephen Choi
(74) *Attorney, Agent, or Firm* — Michael Best & Friedrich LLP

(57) ABSTRACT

A hand saw including a blade, a frame that supports the blade, and a tensioning mechanism. The frame including a first leg having a first blade support, a second leg spaced from the first leg, a cross member extending between the first leg and the second leg, and a handle. The tensioning mechanism including a bracket having a second blade support, the bracket pivotable with respect to the frame in a first direction to increase a distance between the blade supports and in an opposite direction to decrease the distance between the blade supports, a lever actuatable between a tension position and a release position, and a linkage that couples the lever to the bracket such that movement of the lever towards the tension position pivots the bracket in the first direction, and movement of the lever towards the release position pivots the bracket in the second direction.

11 Claims, 7 Drawing Sheets

(56) References Cited

U.S. PATENT DOCUMENTS

| | | | |
|---|---|---|---|
| 1,517,827 | A | 12/1924 | De Grado |
| 1,657,748 | A | 1/1928 | Hanning |
| 2,335,141 | A | 1/1943 | Blum |
| 2,435,964 | A | 2/1948 | Graff |
| 2,519,904 | A | 8/1950 | Hendricksen et al. |
| 2,546,660 | A | 3/1951 | Wilcox |
| 2,613,709 | A | 10/1952 | Terrill et al. |
| 2,651,341 | A | 9/1953 | Hammarstrom |
| 2,725,911 | A | 12/1955 | Glenn |
| 2,880,773 | A | 4/1959 | Contreras et al. |
| 3,060,983 | A | 10/1962 | Andreasson |
| 3,329,187 | A | 7/1967 | Cowley |
| 3,636,997 | A | 1/1972 | Keymer |
| 3,822,731 | A | 7/1974 | Keymar |
| 4,349,059 | A | 9/1982 | Hepworth et al. |
| 4,376,456 | A | 3/1983 | Jacoff |
| 4,466,471 | A | 8/1984 | Thomson |
| 5,388,333 | A | 2/1995 | Chen |
| 5,673,488 | A | 10/1997 | Grayo |
| 5,768,788 | A | 6/1998 | Arnold |
| 5,826,344 | A | 10/1998 | Phelon et al. |
| 6,070,330 | A | 6/2000 | Phelon et al. |
| 6,079,109 | A | 6/2000 | Ranieri |
| 6,266,887 | B1 | 7/2001 | Owens et al. |
| 6,457,244 | B1 | 10/2002 | Huang |
| 6,606,795 | B2 | 8/2003 | Erisoty et al. |
| 6,729,030 | B2 * | 5/2004 | Huang ................ B23D 51/125 30/506 |
| 6,742,268 | B2 | 6/2004 | Chen |
| 6,772,522 | B1 | 8/2004 | Huang et al. |
| 6,820,340 | B1 | 11/2004 | Martin et al. |
| 6,820,341 | B2 * | 11/2004 | Snider ................ B23D 51/03 30/125 |
| 6,925,720 | B2 | 8/2005 | Ranieri |
| 7,007,394 | B2 | 3/2006 | Erisoty et al. |
| 7,210,234 | B2 | 5/2007 | Chen |
| 7,254,893 | B1 | 8/2007 | Huang |
| 8,261,456 | B2 | 9/2012 | Scott et al. |
| 8,555,517 | B2 | 10/2013 | Scott et al. |
| 8,881,411 | B2 * | 11/2014 | Green ................ B23D 51/125 30/513 |
| 2003/0056377 | A1 * | 3/2003 | Huang ................ B23D 51/125 30/513 |
| 2003/0229995 | A1 | 12/2003 | Huang |
| 2004/0074099 | A1 | 4/2004 | Chen |
| 2005/0044731 | A1 | 3/2005 | Ranieri |
| 2005/0133393 | A1 * | 6/2005 | Lawrence ............ A45C 11/00 206/349 |
| 2009/0113729 | A1 | 5/2009 | Chen |
| 2009/0265944 | A1 | 10/2009 | Chao |
| 2010/0192392 | A1 | 8/2010 | Scott et al. |
| 2010/0319201 | A1 | 12/2010 | Scott et al. |
| 2012/0324745 | A1 | 12/2012 | Scott et al. |

OTHER PUBLICATIONS

Nicholson, 4 in 1 Nicholson Pro Series Hacksaw Frame, 550332 (2005) 2 pages.
Stanley, FatMax High Tension Hacksaw, T5322 (2004) 1 page.
DeWALT Tools Full Line Catalog, DWCAT12 (2012) p. 94.
Snap-on Industrial Brands Catalog (2012) p. 451.
LENOX, HT50 High Tension Hacksaw (2013) p. 16.

* cited by examiner

HAND SAW

CROSS-REFERENCE TO RELATED APPLICATIONS

This application claims priority to co-pending U.S. Provisional Patent Application No. 61/847,163 filed on Jul. 17, 2013, the entire content of which is incorporated herein by reference.

BACKGROUND

The present invention relates to saws, and more particularly to hand saws.

Hand saws typically include a frame that supports a cutting blade. The frame can also form a handle of the saw that the user may grasp in order reciprocate the saw with respect to a workpiece to cut the workpiece with the blade. One type of known hand saw is a hacksaw. Hacksaws often include a U-shaped or arched frame and the blade is coupled to the frame such that the blade spans the arch or ends of the frame. The blade of a hacksaw is often coupled to the frame under tension.

SUMMARY

In one embodiment, the invention provides a hand saw including a blade including a first end, a second end, and a longitudinal axis that extends between the first and second ends and a frame that supports the blade. The frame includes a first leg having a first blade support that removably couples the first end of the blade to the frame, a second leg spaced from the first leg, a cross member extending between the first leg and the second leg, and a handle configured to be grasped to reciprocate the blade along the longitudinal axis to cut a workpiece. The hand saw further includes a tensioning mechanism. The tensioning mechanism includes a bracket pivotally coupled to the frame and having a second blade support that couples the second end of the blade to the frame, the bracket pivotable with respect to the frame in a first direction to increase a distance between the first and second blade supports and in a second, opposite direction to decrease the distance between the first and second blade supports, a lever actuatable between a tension position and a release position, and a linkage that couples the lever to the bracket such that movement of the lever towards the tension position pivots the bracket in the first direction to apply tension to the blade, and movement of the lever towards the release position pivots the bracket in the second direction to release tension from the blade.

In another embodiment the invention provides a hand saw including a blade including a first end, a second end, and a longitudinal axis that extends between the first and second ends and a frame that supports the blade. The frame includes a first leg having a first blade support that removably couples the first end of the blade to the frame, a second leg spaced from the first leg, and a cross member extending between the first leg and the second leg. The cross member includes a hollow portion defining a storage space configured to store at least one additional saw blade. The hand saw further includes a tensioning mechanism operable to selectively increase and decrease tension on the blade. The tensioning mechanism includes a bracket pivotally coupled to the frame and having a second blade support that couples the second end of the blade to the frame, and a lever actuatable between a tension position and a release position such that movement of the lever towards the tension position pivots the bracket in the first direction to apply tension to the blade, and movement of the lever towards the release position pivots the bracket in the second direction to release tension from the blade. Wherein the storage space is accessible when the lever is in one of the tension position and the release position, and wherein the storage space is substantially inaccessible when the lever is in the other of the tension position and the release position.

Other features and aspects of the invention will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
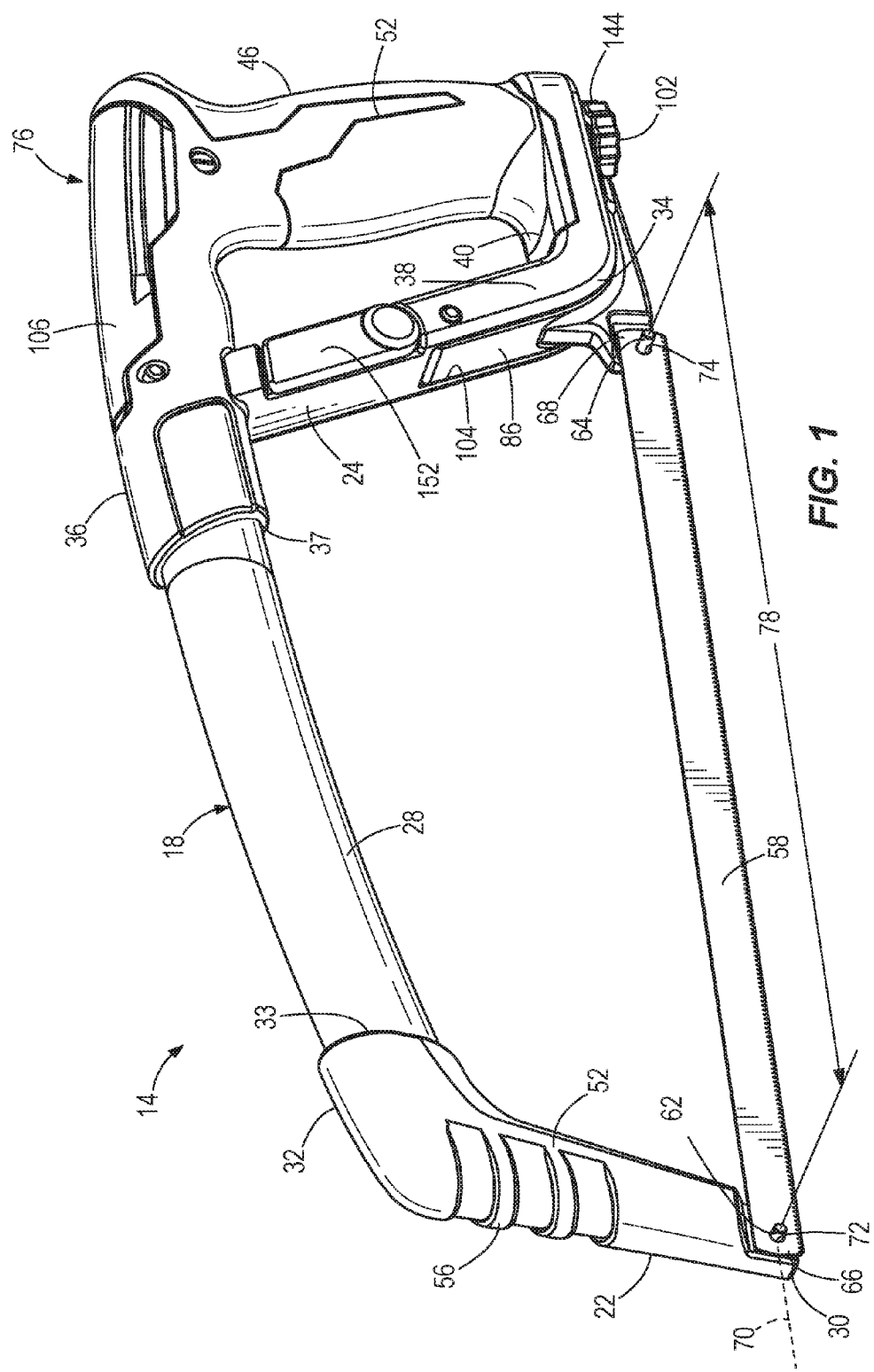
FIG. 1 is a perspective view of a hand saw according to an embodiment of the invention.

FIG. 1 illustrates a hand saw 14, which is a hacksaw in the illustrated embodiment. While the illustrated hand saw 14 is a hacksaw, in other embodiments, the saw could be any suitable type of saw. The hacksaw 14 includes a generally U-shaped frame 18 having a first leg 22, a second leg 24, and a cross-member 28 that extends from the first leg 22 to the second leg 24. While the hacksaw 14 includes the generally U-shaped frame 18, in other embodiments, other types and shapes of frames may be utilized. The first leg 22 includes a first end 30 and a second end 32 that includes a receptacle 33. The second leg 24 includes a first end 34 and a second end 36 that includes a receptacle 37. In the illustrated embodiment, the cross-member 28 is a hollow tube that extends from the second end 32 of the first leg 22 to the second end 36 of the second leg 24. In other embodiments, the cross-member 28 can be a solid member and have any desired cross-section. Ends of the cross-member 28 are press-fit within the receptacles 33 and 37 to couple the cross-member 28 to the first and second legs 22, 24. In other embodiments, the cross-member 28 may be coupled to the first and second legs 22, 24 in any suitable manner (e.g., fusion-bonding, adhesives, fasteners, etc.). Alternatively, the cross-member 28 may be integrally formed with one or both of the first and second legs 22, 24 as a single piece.

The frame 18 further includes a handle 46 to provide one place for the user of the hacksaw 14 to grip while using the hacksaw 14. A base 40 of the frame 18 extends from the first end 34 of the second leg 24 to the handle 46. The frame 18 can be formed from metal materials such as cast steel, die cast A380 aluminum, titanium, and the like. In other embodiments, the frame 18 can be formed from injection molded polymeric materials, such as Nylon 6. In still other embodiments, the frame 18 can be formed from a combination of metal materials and polymeric materials. Alternatively, other suitable types of materials can be utilized.

With continued reference to FIG. 1, the illustrated hacksaw 14 includes thermoplastic elastomer (TPE) over-moldings 52. A second or auxiliary handle 56 is formed by the over-molding 52 and the first leg 22. The second handle 56 provides the user with an additional or alternative place to grip the saw 14.

A blade 58 of the hacksaw 14 is coupled to the frame 18 by a first blade support 62 and a second blade support 64. The blade 58 includes a first end 66, a second end 68, and a longitudinal axis 70 that extends between the first end 66 and the second end 68. The blade 58 further includes a first aperture 72 adjacent the first end 66 and a second aperture 74 adjacent the second end 68. In the illustrated embodiment, the blade supports 62, 64 are both pins. The apertures 72, 74 of the blade 58 receive the pins 62, 64, respectively, to removably couple the saw blade 58 to the frame 18.

Figure 2:
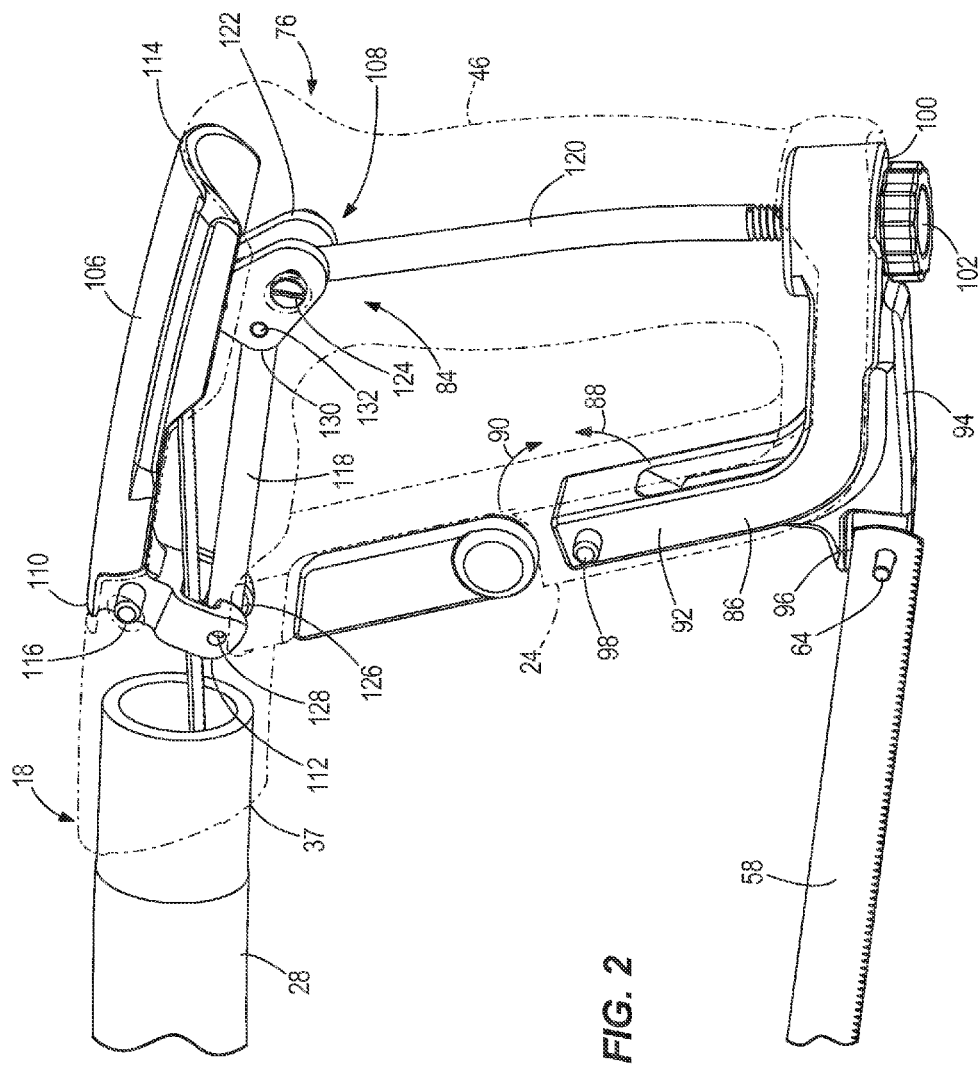
FIG. 2 is an enlarged view of a portion of the hand saw of FIG. 1 with portions of a frame of the hand saw shown as translucent.

The hacksaw 14 further includes a tensioning mechanism 76 that is operable to vary a distance 78 between the pins 62, 64 in order to apply tension to the blade 58. Referring to FIG. 2, the tensioning mechanism 76 is partially housed within a cavity 84 formed in the handle 46 of the frame 18. The tensioning mechanism 76 includes a bracket 86 pivotally coupled to the frame 18 such that the bracket 86 is pivotable with respect to the frame 18 in a first direction (direction of arrow 88 of FIG. 2) to increase the distance 78 (FIG. 1) between the pins 62, 64 and in a second direction (direction of arrow 90) to decrease the distance 78 between the pins 62, 64.

With continued reference to FIG. 2, the bracket 86 is generally L-shaped and includes a first portion 92, a second portion 94 extending from the first portion 92, and a blade support portion 96. The first portion 92 receives a pin 98 that pivotally couples the bracket 86 to frame 18. The pin 64 for coupling the blade 58 to the frame 18 is coupled to the blade support portion 96 for movement with the bracket 86 relative to the frame 18. The second portion 94 includes a bore 100 for receiving a tension adjustment member 102 of the tensioning mechanism 76, described in greater detail below. The bracket 86 is partially disposed within a recessed area 104 formed along an exterior of the support member 38 and the base 40 of the frame 18. As such, the first portion 92 generally follows the contour of the support member 38, and the second portion 94 generally follows the contour of the base 40.

Figure 4:
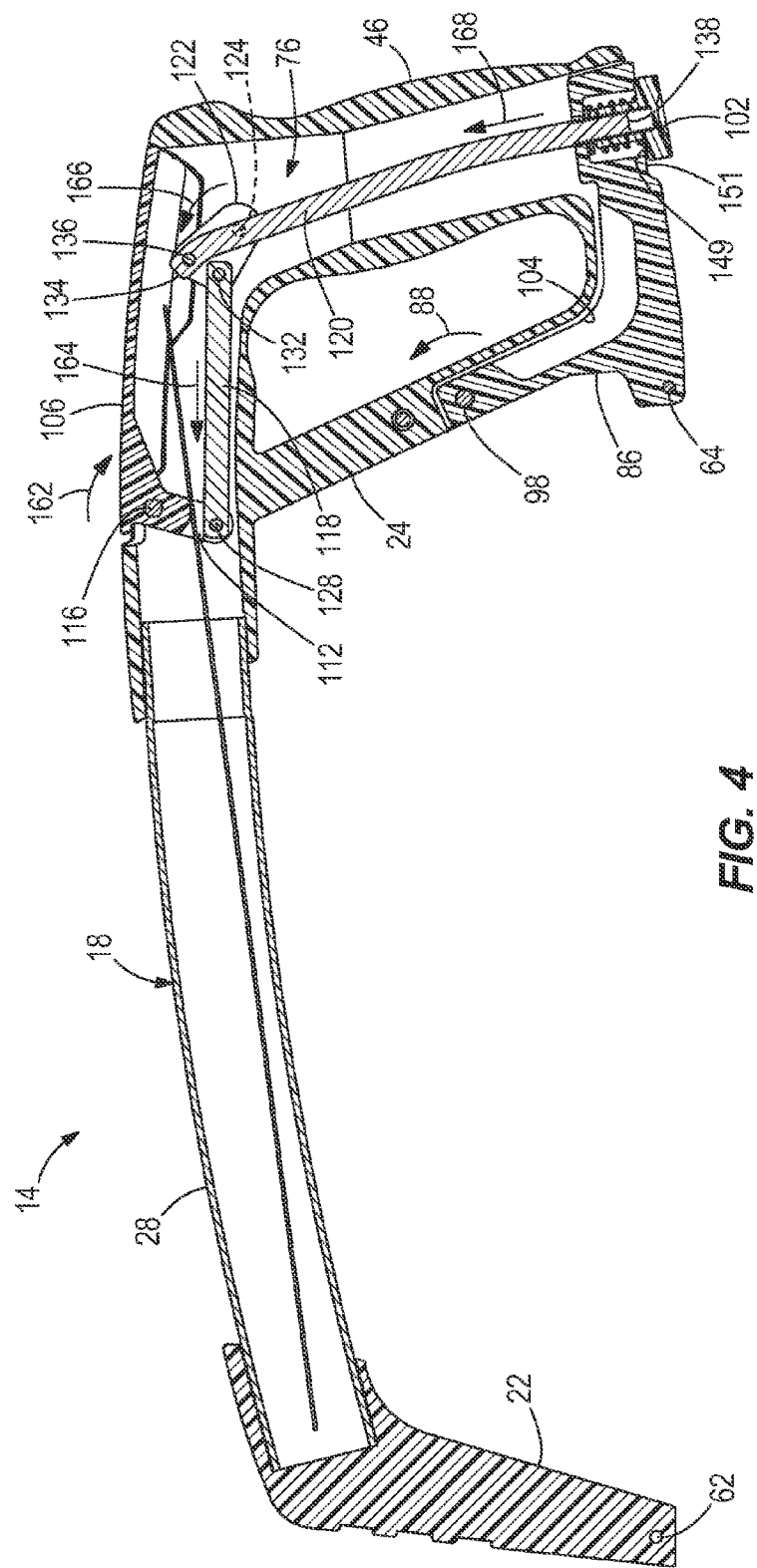
FIG. 4 is a cross-sectional view the hand saw of FIG. 1, with a blade of the hand saw removed and illustrating a tensioning lever of the saw in a tension position.
Figure 5:
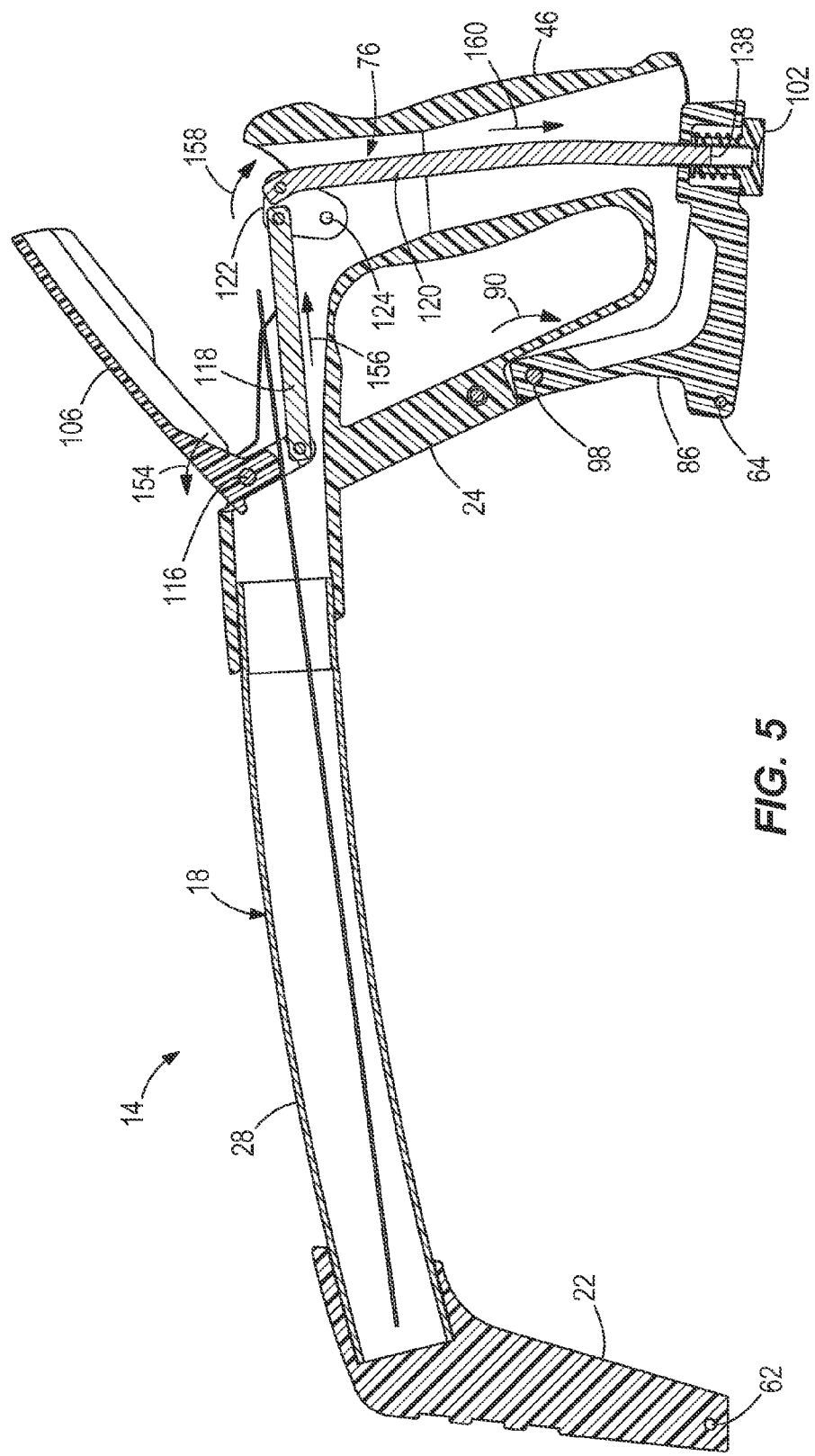
FIG. 5 is a view similar to FIG. 4, but illustrating the tensioning lever in a release position.

The tensioning mechanism 76 further includes a lever 106 and a linkage 108 that couples the lever 106 to the bracket 86. The lever 106 includes a first end 110, a clevis 112 extending from the first end 110, and a second end 114 opposite the first end 110. A pin 116 pivotally connects the lever 106 to the frame 18 adjacent the first end 110 of the lever 106. As will be discussed in greater detail below, the lever 106 can pivot about the pin 116 between a tension position (FIG. 4) and a release position (FIG. 5). The lever 106 has a curved shape that generally matches the contour of the frame 18 when the lever 106 is in the tension position.

Figure 3:
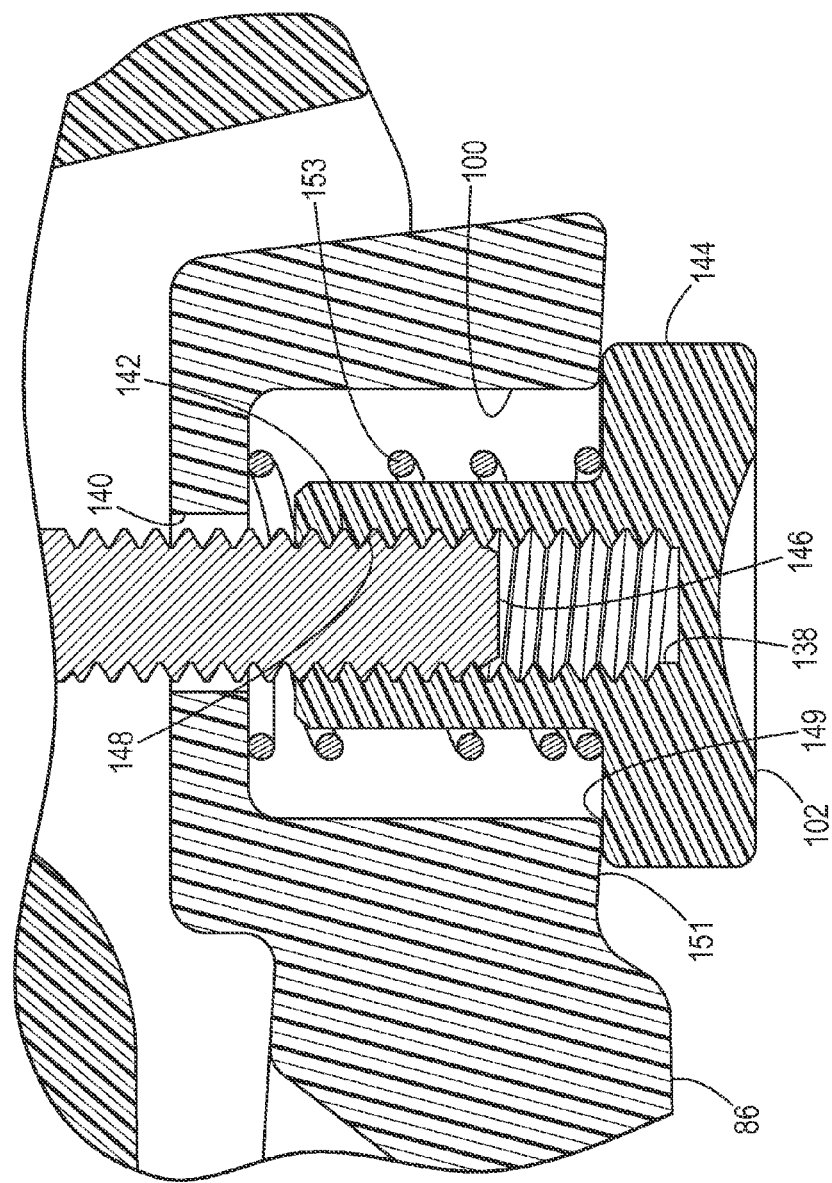
FIG. 3 is an enlarged cross-sectional view of a tension adjustment member of the hand saw of FIG. 1.

With reference to FIG. 2, the linkage 108 includes a first rod 118, a second rod 120, and a pivot member 122 pivotally coupled to the frame 18 by a pin 124. The first rod 118 has a first end 126 pivotally coupled to the clevis 112 of the lever 106 by a pin 128, and a second end 130 pivotally coupled to the pivot member 122 by a pin 132. The second rod 120 has a first end 134 (FIG. 4) pivotally coupled to the pivot member 122 by a pin 136, and a second end 138 opposite the first end 134. Best illustrated in FIG. 3, the second end 138 extends through an aperture 140 of the bracket 86, and includes threads 142 that engage with the tension adjustment member 102 within the bore 100 of the bracket 86. In the illustrated embodiment, the tension adjustment member 102 is a threaded bushing including a knurled knob 144 and an aperture 146 having threads 148. As described in greater detail below, an axial face 149 of the knurled knob 144 is engageable with a periphery 151 of the bore 100 to rotate the bracket 86 in the direction of arrow 88 (FIG. 2) and increase the distance 78 (FIG. 1) between the pins 62, 64. The second end 138 of the second rod 120 extends into the aperture 146 of the bushing 102, and the threads 142 and 148 allow the position of the bushing 102 to be varied along the second rod 120 by the user rotating the bushing 102 (i.e., by grabbing and rotating the knurled knob 144). A biasing member 153, which is a coil spring in the illustrated embodiment, is disposed within the bore 100 and exerts a biasing force on the axial face 149 of the knurled knob 144 (FIG. 3). The biasing force increases friction between the threads 142 and 148 to prevent inadvertent rotation of the bushing 102 with respect to the second rod 120. In addition, the biasing member 153 exerts a corresponding biasing force on the bore 100 that provides a preload on the bracket 86 in the direction of arrow 88. This preload maintains some tension on the saw blade 58 when the lever 106 is in the release position to prevent the saw blade 58 from falling off of the pins 62, 64.

Figure 6:
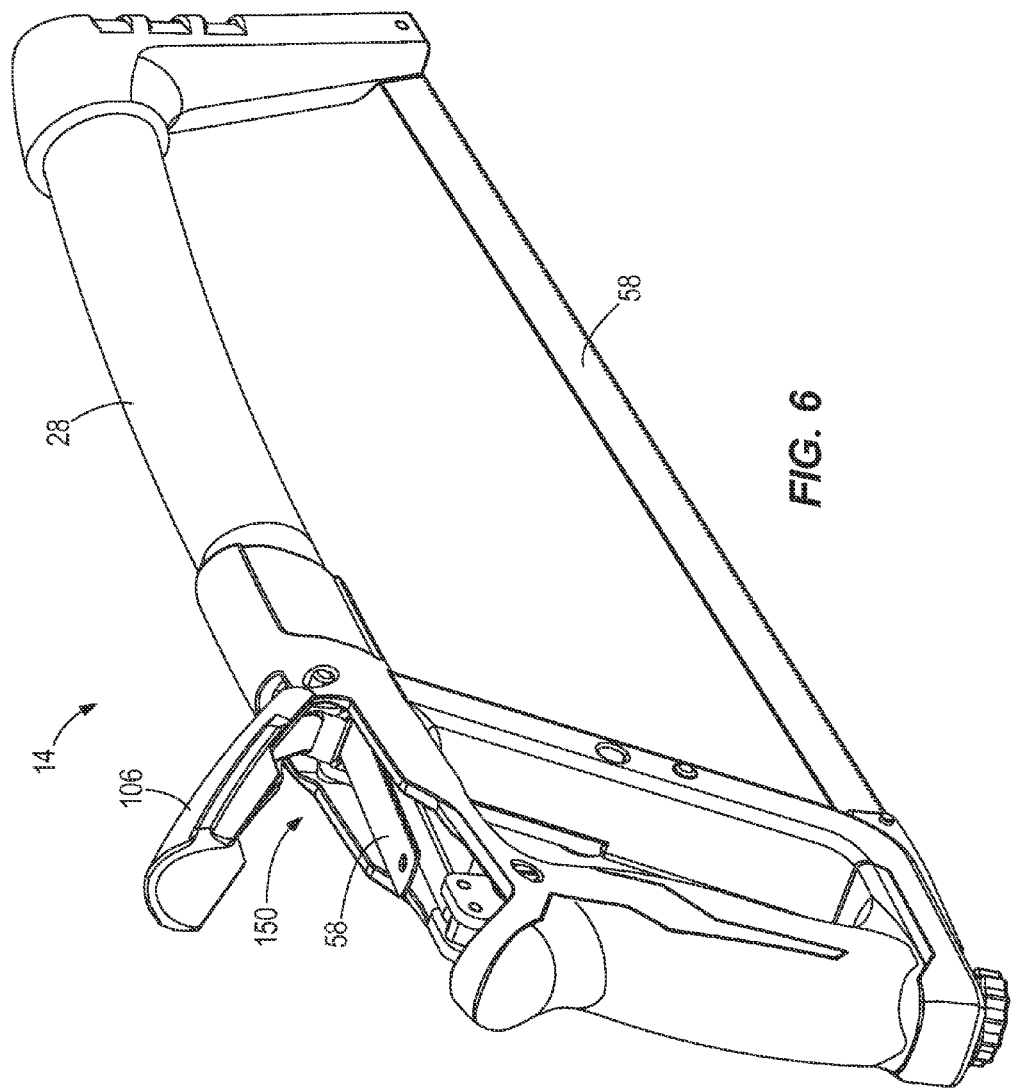
FIG. 6 is a perspective view of the hand saw of FIG. 1, illustrating a storage location for a spare saw blade.

Referring to FIG. 6, the saw 14 also includes a storage space 150 for a spare saw blade 58. The spare saw blade 58 stored within the hollow cross-member 28, and is accessible when the lever 106 is in the release position.

Figure 7:
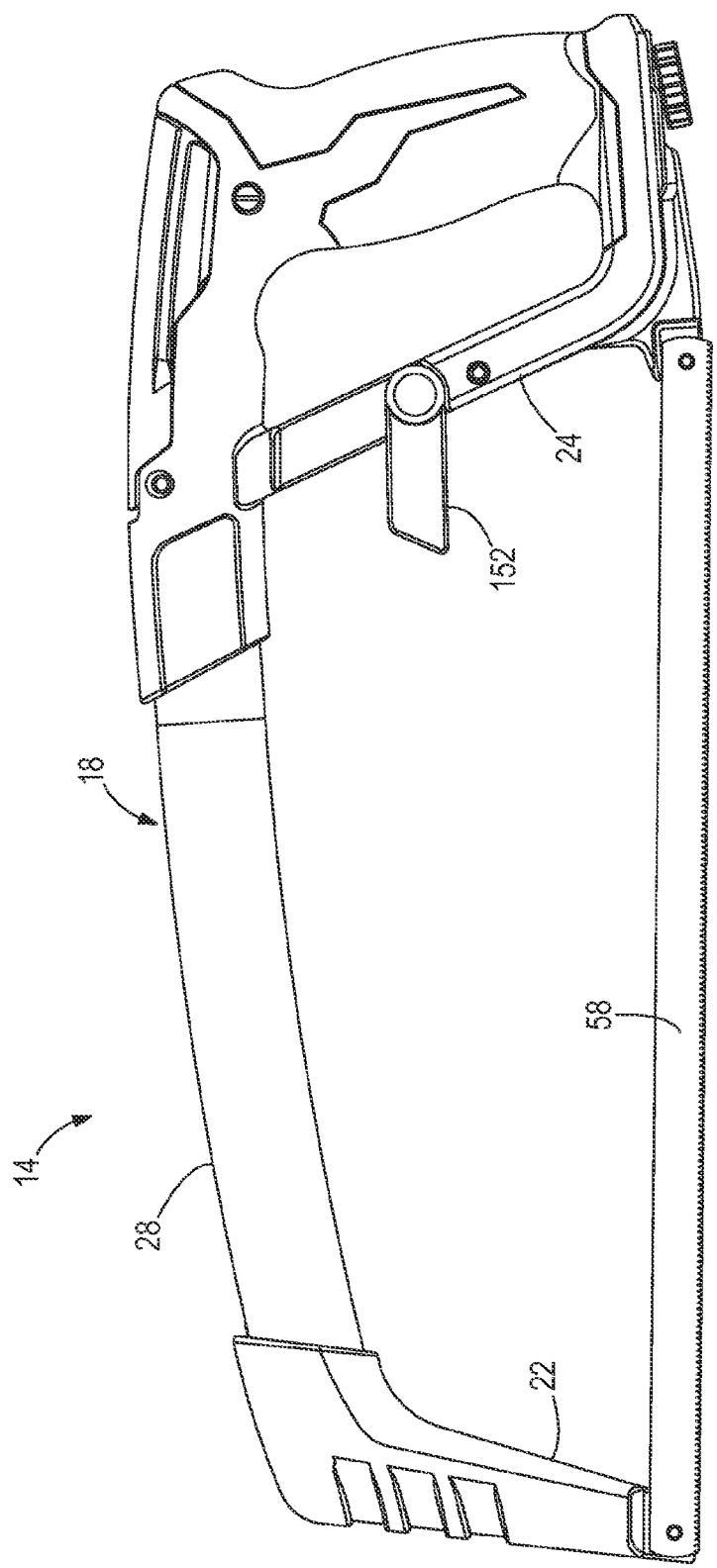
FIG. 7 is a side view of the hand saw of FIG. 1, illustrating a clip of the saw.

With reference to FIG. 7, the saw 14 further includes a clip 152 coupled to the second leg 24 of the frame 18. The clip 152 can be used to couple the saw 14 to a user's work belt, ladder, tool bucket, or the like. The clip 152 is rotatable between a stowed position (FIG. 1) and a deployed position (FIG. 7).

In operation, to load or attach the blade 58 to the saw 14, the user places the lever 106 in the release position (FIG. 5) in order to release the tension of the saw blade 58. The user places the lever 106 in the release position by pivoting the lever 106 about the pin 116 upwardly, or in the direction of arrow 154. As the lever 106 pivots, the first rod 118 moves relative to the frame 18 generally in the direction of arrow 156. This causes the pivot member 122 to pivot about the pin 124, in the direction of arrow 158. As a result, the second rod 120 moves downwardly (generally in the direction of arrow 160), allowing the bracket 86 to pivot downwardly in the direction of arrow 90. This decreases the distance 78 (FIG. 1) between the blade supports 62, 64.

Next, the user inserts the pins 62, 64 of the saw 14 through the apertures 72, 74 of the saw blade 58, respectively (FIG. 1). With the blade 58 coupled to the pins 62, 64, the user moves the lever 106 to a tension position (FIG. 4) in order to apply tension to the saw blade 58. The user places the lever 106 in the tension position by pivoting the lever 106 about the pin 116 downwardly, or in the direction of arrow 162. As the lever 106 pivots, the first rod 118 moves relative to the frame 18 generally in the direction of arrow 164. This causes the pivot member 122 to pivot about the pin 124, in the direction of arrow 166. As a result, the second rod 120 moves upwardly (generally in the direction of arrow 168).

The axial face 149 of the bushing 102 bears against the bracket 86, causing the bracket 86 to pivot upwardly in the direction of arrow 88. This increases the distance 78 (FIG. 1) between the blade supports 62, 64. As the user continues to rotate the lever 106 and move the bracket 86, the blade 58 is stretched in order to apply tension to the blade 58. Meanwhile, the frame 18 begins to flex or collapse in response to the tension of the blade 58. The user continues to rotate the lever 106 about the pin 116 until the lever 106 fully reaches the tension position, which is illustrated in FIGS. 1, 2, 4 and 7.

Referring to FIG. 1, with the blade 58 coupled to the frame 18 and tension applied to the blade 58, the user can grasp the handle 46 of the saw 14 to reciprocate the saw 14 along the longitudinal axis 70 of the blade 58 to cut a workpiece. When the blade 58 becomes dull or worn, the user may replace the blade 58 by moving the lever 106 to the release position and attach a new blade 58 (e.g., the spare blade 58 of FIG. 7) to the frame 18 as discussed above.

The user may rotate the bushing 102 to adjust the amount of tension that is applied to the blade 58 by the tensioning mechanism 76. If the user rotates the bushing 102 to move the second rod 120 relative to the bushing 102 in the direction of arrow 160, the bracket 86 will pivot upwardly in the direction of arrow 88, and thus the distance 78 will decrease, which increases the amount of tension that is applied to the blade 58. Conversely, if the user rotates the bushing 102 to move the second rod 120 relative to the bushing 102 in the direction of arrow 168, the bracket 86 will pivot downwardly in the direction of arrow 90, and thus the distance 78 will decrease, which decreases the amount of tension that is applied to the blade 58. Once the user sets the desired amount of tension, the biasing member 153 inhibits inadvertent rotation of the bushing 102.

Various features of the invention are set forth in the following claims.

What is claimed is:

1. A hand saw comprising:
   a blade including a first end, a second end, and a longitudinal axis that extends between the first and second ends;
   a frame that supports the blade, the frame including
      a first leg having a first blade support that removably couples the first end of the blade to the frame,
      a second leg spaced from the first leg,
      a cross member extending between the first leg and the second leg, and
      a handle configured to be grasped to reciprocate the blade along the longitudinal axis to cut a workpiece; and
   a tensioning mechanism including
      a bracket pivotally coupled to the frame and having a second blade support that couples the second end of the blade to the frame, the bracket pivotable with respect to the frame in a first direction to increase a distance between the first and second blade supports and in a second, opposite direction to decrease the distance between the first and second blade supports,
      a lever actuatable between a tension position and a release position, and
      a linkage that couples the lever to the bracket such that movement of the lever towards the tension position pivots the bracket in the first direction to apply tension to the blade, and movement of the lever towards the release position pivots the bracket in the second direction to release tension from the blade;
   wherein the tensioning mechanism further includes a biasing member that biases the bracket in the first direction to maintain engagement between the first and second blade supports and the first and second ends of the blade when the lever is in the release position.

2. The hand saw of claim 1, wherein the increased distance between the first blade support and the second blade support provides a higher tension on the blade and the decreased distance between the first blade support and the second support provides a lower tension on the blade.

3. The hand saw of claim 1, wherein the lever is coupled to the frame by a pin, and wherein the lever is pivotable about the pin between the tension position and the release position.

4. The hand saw of claim 1, wherein the tensioning mechanism further includes a tension adjustment member that is rotatable to increase and decrease the distance between the first and the second blade supports.

5. The hand saw of claim 4, wherein the linkage includes
   a pivot member pivotally coupled to the frame,
   a first member having a first end coupled to the lever and a second end coupled to the pivot member, and
   a second member having a first end coupled to the pivot member and a second end coupled to the tension adjustment member.

6. The hand saw of claim 5, wherein the second member extends along the handle.

7. The hand saw of claim 6, wherein the tension adjustment member includes a bushing threadably engaged with the second end of the second member.

8. The hand saw of claim 5, further comprising a clevis extending from the lever, wherein the first end of the first member is pivotally coupled to the clevis.

9. The hand saw of claim 1, wherein the cross member includes a storage space configured to store extra saw blades.

10. The hand saw of claim 1, wherein the hand saw further comprises a clip pivotally coupled to the second leg for movement relative to the second leg between an extended position and a retracted position, wherein the clip is configured to store the hand saw on a belt when in the extended position.

11. The hand saw of claim 1, wherein the frame further includes a cavity formed in at least one of the handle and the second leg, and wherein the tensioning mechanism is at least partially housed within the cavity.

* * * * *